United States Patent Office 3,483,084
Patented Dec. 9, 1969

3,483,084
AMYLOGLUCOSIDASE PURIFICATION
Moshe Sternberg, South Bend, Ind., assignor to Miles Laboratories, Inc., Elkhart, Ind., a corporation of Indiana
No Drawing. Filed May 29, 1967, Ser. No. 642,199
Int. Cl. C07g 7/02; C12d 13/10
U.S. Cl. 195—66                                           3 Claims

ABSTRACT OF THE DISCLOSURE

Transglucosidase impurity can be removed from amyloglucosidase solution by mixing such solutions with chloroform to form a precipitate with transglucosidase and then separating the precipitate from the so-purified amyloglucosidase.

BACKGROUND AND PRIOR ART

Amyloglucosidase, an enzyme which has also been referred to as glucamylase, glucogenic enzyme, starch glucogenase, gamma-amylase and $\alpha$ -1,4, glucan glucohydrase, is a well-known material which catalyzes the hydrolysis of starch to dextrose. This enzyme appears to aid in the formation of dextrose directly from starch without the production of intermediate products, such as higher sugars and soluble dextrins. This enzyme is also capable of catalyzing the hydrolysis of intermediate starch hydrolysis products to dextrose.

Amyloglucosidase is known to be prepared by fermentation processes employing certain strains of fungi belonging to the *Aspergillus niger* group and certain strains of Rhizopus species. Illustrative fungi are those of the species *Aspergillus niger, Aspergillus oryzae, Rhizopus delemar, Aspergillus phoenicis* and the like.

The fungal strains producing amyloglucosidase are also known to produce other enzymes, such as transglucosidase. Transglucosidase promotes the formation, particularly from maltose and glucose, of unfermentable carbohydrates. When transglucosidase is present as a contaminant in amyloglucosidase employed to hydrolyze starch to dextrose, lower yields of dextrose are obtained than if the transglucosidase were absent. The presence of transglucosidase in the usual amyloglucosidase preparations has been generally recognized and considerable work has been carried out to reduce and substantially eliminate the transglucosidase impurity in amyloglucosidase.

Prior art methods for removing transglucosidase from amyloglucosidase have employed clay, synthetic magnesium silicate, fuller's earth, and ion-exchange materials to selectively adsorb the transglucosidase. Selective precipitation of the transglucosidase impurity has also been employed. None of the prior art purification methods were commercially satisfactory for removal of substantial amounts of the transglucosidase impurity without also removing appreciable amounts of the desired amyloglucosidase product.

STATEMENT OF THE INVENTION

In accordance with the present invention, a process is provided for removing transglucosidase impurities from amyloglucosidase which comprises mixing an amyloglucosidase solution containing transglucosidase impurity with chloroform to form a precipitate between the transglucosidase and the chloroform and then separating the precipitate from the so-purified amyloglucosidase. This process has the advantages of removing substantial amounts of transglucosidase without also removing appreciable amounts of amyloglucosidase.

DESCRIPTION OF THE INVENTION

The process of the present invention is useful for purifying amyloglucosidase in various forms. It can be in the form of aqueous whole cultures and fermentation beers known in the art. It can also be in the form of dried material which is then dissolved in aqueous media for use in the present process. The concentration of amyloglucosidase in the aqueous solution is not critical. As is known in the art, dilute solutions will require large quantities of liquid material to be processed in order to purify a given quantity of amyloglucosidase. The more concentrated solutions will enable a given quantity of amyloglucosidase to be purified with less effort and in a shorter period of time.

In the practice of this invention an aqueous solution of amyloglucosidase is mixed with chloroform. It is preferred to use the chloroform in an amount of about 1 volume percent based on the volume of the amyloglucosidase solution. However, chloroform can be used in amounts from about 0.1 to about 5 volume percent based on the volume of the amyloglucosidase solution. The pH of the amyloglucosidase solution should be in the range of from about 2.3 to about 2.6, preferably about 2.5, when it is mixed with the chloroform. When the pH is below about 2.3, the chloroform treatment tends to precipitate a substantial amount of the amyloglucosidase along with the transglucosidase impurity. When the pH is above about 2.6, there is no separation of transglucosidase from amyloglucosidase. The mixing temperature is from about 35° C. to about 50° C., preferably about 40° C. When the temperature is below about 35° C., there is no separation of transglucosidase from amyloglucosidase. When the temperature is above about 50° C., substantially all amyloglucosidase activity is lost. The mixing time is from about 10 minutes to about 40 minutes, preferably about 30 minutes.

The process of the present invention removes transglucosidase from amyloglucosidase with minimum loss of amyloglucosidase. Well-known methods are employed for determining amyloglucosidase content (defined in terms of activity units per ml.) of starting material and purified material to measure amyloglucosidase recovery. Transglucosidase removal is determined by incubating a maltose solution with the amyloglucosidase purified by the present process and measuring the optical activity (specific rotation) of the resulting product. This specific rotation value is then compared with the specific rotation value obtained by incubating a maltose solution with amyloglucosidase which has not been purified by the present process. The specific rotation value obtained with purified material will be lower than the specific rotation value obtained with the unpurified material. The higher the specific rotation value of any given sample, the higher will be the transglucosidase content.

The methods for determining amyloglucosidase activity and transglucosidase activity are described below.

*Amyloglucosidase activity.*—An aqueous solution is prepared containing 4.0 g. of soluble starch (moisture-free basis) and 5.6 ml. of 1.1 M acetate buffer, pH 4.2, per 100 ml. Exactly 50 ml. of the buffered starch solution is pipetted into a 100 ml. volumetric flask and equilibrated in a water bath at 60° C. for 15 minutes. Then 1.0 ml. of enzyme solution, properly diluted so that 20% to 30% hydrolysis will occur during the incubation period, is added and mixed. After exactly 60 minutes of incubation in the water bath at 60° C., the solution is adjusted to a pink phenolphthalein end point by adding 2 N sodium hydroxide. The solution is then cooled to room temperature and diluted to volume with distilled water. Reducing sugar, calculated as dextrose, is determined on the diluted sample and on a blank solution treated in the same way but with no added enzyme. Dextrose content is conveniently determined by the well-known Schoorl method described in National Bureau of Standards Circular C—440, "Polarimetry, Saccharimetry and the Sugars," pp. 192–193 (1942). Amyloglucosidase activity is calculated from the formula:

$$A = \frac{S-B}{E}$$

where:

A = amyloglucosidase activity, units per ml. of enzyme preparation.
S = reducing sugars in enzyme treated sample, grams per 100 ml. diluted sample.
B = reducing sugars in blank, grams per 100 ml. diluted sample.
E = amount of enzyme used, ml. per 100 ml. diluted sample.

*Transglucosidase activity.*—A solution of maltose is prepared by dissolving 100.0 g. C.P. maltose in distilled water and diluting to 500 ml. A 50.0 ml. portion of this 20 percent (percent w./v.) maltose solution is then placed in a 100 ml. flask and diluted to 100 ml. with distilled water. To the flask containing a 10 percent (percent w./v.) maltose solution is added 5 ml. of 1.0 M acetate buffer, pH 4.0. After mixing, an amount of enzyme preparation containing 5:0 units of amyloglucosidase activity is added. The flask is placed in a 60° C. water bath and heated for 72 hours. At the end of this incubation period, the optical rotation of the sugar solution is measured by well-known techniques. The higher the specific rotation measured at 20° C., $[\alpha]_D^{20}$, the higher will be the transglucosidase activity or content of the enzyme preparation being tested.

The present invention will be further described in the following illustrative examples.

Example 1

An aqueous amyloglucosidase solution was obtained by fermenting an aqueous corn mash with a fungal strain of the *Aspergillus niger* group and then filtering off the mycelium. The filtrate contained 7.30 amyloglucosidase activity units per ml. The pH of the filtrate was adjusted to 2.5 by addition of sufficient quantity of hydrochloric acid. Chloroform was then added in an amount of 1 volume percent based on the volume of the amyloglucosidase solution. This mixture was then agitated for 30 minutes at 40° C. during which time a precipitate formed. The pH was then adjusted to about 4.0 by addition of NaOH to stop chloroform activity. The resultant mixture was filtered. This filtrate contained 5 amyloglucosidase activity units per ml. which represented a retention of 68.5 percent of the amyloglucosidase activity. Transglucosidase activity was measured on the original amyloglucosidase solution prior to mixing with chloroform and on the final filtrate after treatment with chloroform. Specific rotation of the starting material was $$[\alpha]_D^{20} = 55.04°$$

Specific rotation of the purified amyloglucosidase was 54.00°. This significant reduction in optical rotation of the purified product indicates substantial removal of transglucosidase impurity.

Example 2

The procedure of Example 1 was repeated using an amyloglucosidase solution containing 10.5 amyloglucosidase activity units per ml. and chloroform was added in an amount of 0.1 volume percent. The mixture was agitated for 30 minutes at 40° C. and the precipitate that formed was removed by centrifugation. The supernatant liquid was then cooled to 15° C. This liquid contained 10.0 amyloglucosidase activity units per ml. which represented a retention of 95.3 percent of amyloglucosidase activity. Specific rotation in the transglucosidase assay of the starting material was 55.00° while specific rotation in the transglucosidase assay of the purified material was 53.96°.

Example 3

The procedure of Example 2 was repeated using chloroform in an amount of 5 volume percent. The purified amyloglucosidase retained 64 percent of the original amyloglucosidase activity. Specific rotation in the transglucosidase assay of the purified material was 53.19°.

In summary, transglucosidase impurity can be conveniently removed from amyloglucosidase preparations without appreciable loss of amyloglucosidase activity by treating the amyglucosidase with chloroform to form a separable precipitate with the transglucosidase.

What is claimed is:

1. A process for removing transglucosidase impurities from amyloglucosidase which comprises mixing an amyloglucosidase solution containing transglucosidase impurity and having a pH of from about 2.3 to about 2.6 with chloroform to form a precipitate between the transglucosidase and the chloroform and then separating the precipitate from the so-purified amyloglucosidase.

2. A process according to claim 1 wherein the chloroform is added in an amount of from about 0.1 to about 5 volume percent based on the volume of the amyloglucosidase solution, the mixing temperature is from about 35° C., to about 50° C. and the mixing time is from about 10 minutes to about 40 minutes.

3. A process according to claim 1 wherein the pH of the amyloglucosidase solution is about 2.5, the chloroform is added in an amount of about 1 volume percent based on the volume of the amyloglucosidase solution, the mixing temperature is about 40° C. and the mixing time is about 30 minutes.

References Cited

UNITED STATES PATENTS 3,303,102    2/1967    Armbruster et al. _____ 195—31

LIONEL M. SHAPIRO, Primary Examiner